March 17, 1970   J. REISBERG   3,500,923
USE OF HIGHLY SALINE ETHOXYLATED SURFACTANT
SYSTEM FOR OIL RECOVERY
Filed Aug. 8, 1968   2 Sheets-Sheet 1

RECOVERY OF PETROLEUM FROM SAND PACKS WIDTH SULFATED ALCOHOL (NEODOL) ETHOXYLATES

THE EFFECT OF NaCl CONC.
CONC. SA = 5%

RECOVERY OF PETROLEUM
FROM BEREA SANDSTONE CORE
L = 10", DIAM = 2"
PERM = 400 MD

CHEM. SYSTEM:
5% TERGITOL 15-S-4.0 SULFATE (Na)
4.0 M NaCl

INVENTOR:
JOSEPH REISBERG
BY:
HIS AGENT

United States Patent Office 3,500,923
Patented Mar. 17, 1970

3,500,923
USE OF HIGHLY SALINE ETHOXYLATED SURFACTANT SYSTEM FOR OIL RECOVERY
Joseph Reisberg, Houston, Tex., assignor to Shell Oil Company, New York, N.Y., a corporation of Delaware
Filed Aug. 8, 1968, Ser. No. 751,261
Int. Cl. E21b 43/22
U.S. Cl. 166—274                     6 Claims

ABSTRACT OF THE DISCLOSURE

An improved method for recovering oil from an underground formation by pretreating said formation prior to subjecting it to a drive fluid, with a slug of an aqueous solution containing a synergistic mixture of a sulfated polyoxylated organic compound and an inorganic ionizable salt present in a critical electrolyte concentration capable of effecting a two-phase coacervate system.

BACKGROUND OF THE INVENTION

Figure 1A:
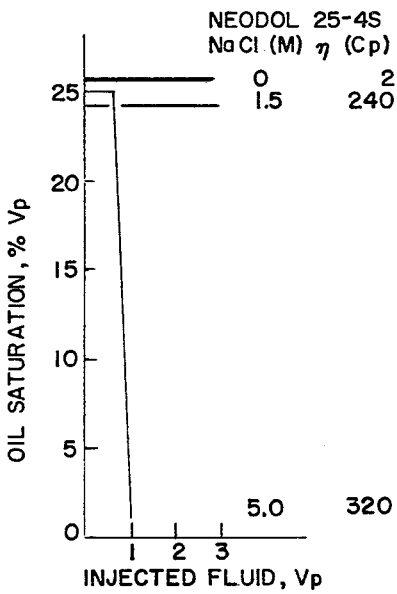

This invention relates to the displacement of oil from the pores of subterranean, oil-containing reservoirs, and more particularly to special surface-active systems to be used with "waterflooding" techniques to improve the oil displacement efficiency of waterfloods.

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has lead to the use of the so-called "secondary recovery" techniques which have as their primary purpose the economical recovery of additional quantities of the residual oil known to be present in the reservoir.

Probably one of the more common secondary recovery techniques is the so-called "waterflooding" in which aqueous fluids are injected at one point in the reservoir at pressures sufficient to be forced out into the reservoir and toward a spaced production well or wells, there, in effect, displacing it from the pores of the reservoir and driving the oil ahead of the water front.

However, waterflooding is only advantageous when the cost of injecting water and necessary chemical modifiers is less than the value of the oil reccovered. Therefore, the displacement efficiency of waterfloods has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only such a range the increase in the amount of oil that can be recovered is not generally significant. Thus, the cost of obtaining the reduction in the interfacial tension is apt to be more than the value of the increased amount of oil that is recovered in many cases.

Although conventional surfactant systems are generally effective, a compatibility problem arises when surfactant mixtures, such as salts of carboxylic or sulfonic acids are used, particularly when polyvalent ions are also present, resulting in the precipitation of the surfactant and plugging of the pores of the earth formation.

SUMMARY OF THE INVENTION

It has now been discovered that oil recovery using a drive fluid such as waterflooding can be greatly and effectively improved by pretreating an oil-bearing formation with a slug of an aqueous solution containing a synergistic mixture of (1) a sulfated polyoxylated organic surfactant and derivatives thereof and (2) a soluble inorganic electrolyte present in a concentration exceeding the critical concentration for forming a two-phase coacervate system by an amount sufficient to convert the two-phase system to a turbid dispersion. Specifically, the concentration of the inorganic electrolyte in the aqueous solution containing at least one sulfated polyoxylated organic surfactant such as a sulfated polyoxylated alcohol shoud be present in a concentration of at least about 1 mole and preferably at least 3 moles or higher and capable of exceeding with increasing electrolytic salt concentration a two-phase system exhibiting at least some turbidity at reservoir temperature which indicates increased oil recovery activity. Generally, the concentration of the inorganic electrolytic halide salt can vary from about 2 moles to about 5 moles or higher in aqueous solutions such as water containing an alkali metal (Na, K), ammonia or amine sulfated polyoxylated alcohol in which the molecule contains at least a plurality of oxylate units having the formula $-(OR)-$ where R is $C_2-C_8$ and preferably $C_2-C_4$ alkylene radical. The aqueous phase of such systems containing high concentrations of electrolyte can be any aqueous solution, e.g., sea water or connate water containing the electrolyte in the minimum concentration exceeding that necessary to form a two-phase system by an amount sufficient to convert the two-phase system to a turbid dispersion.

Figure 1B:
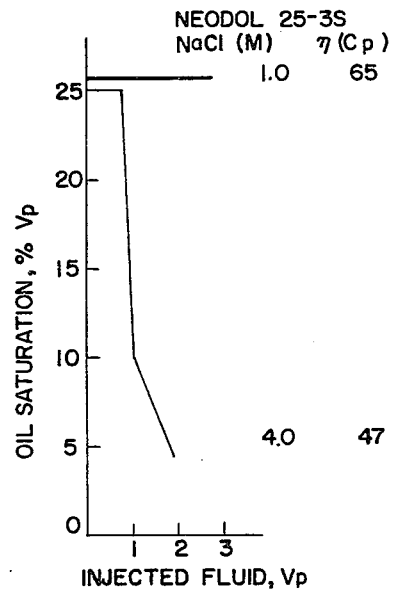
Figure 1C:
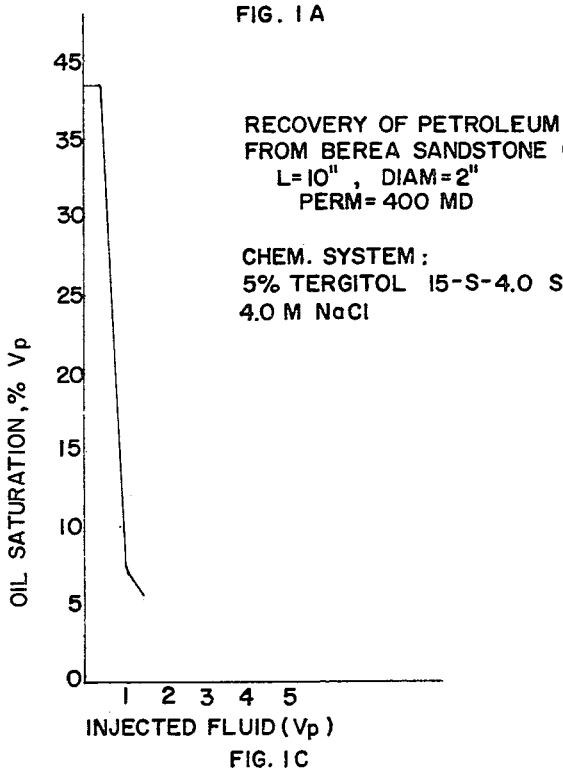
Figure 2:
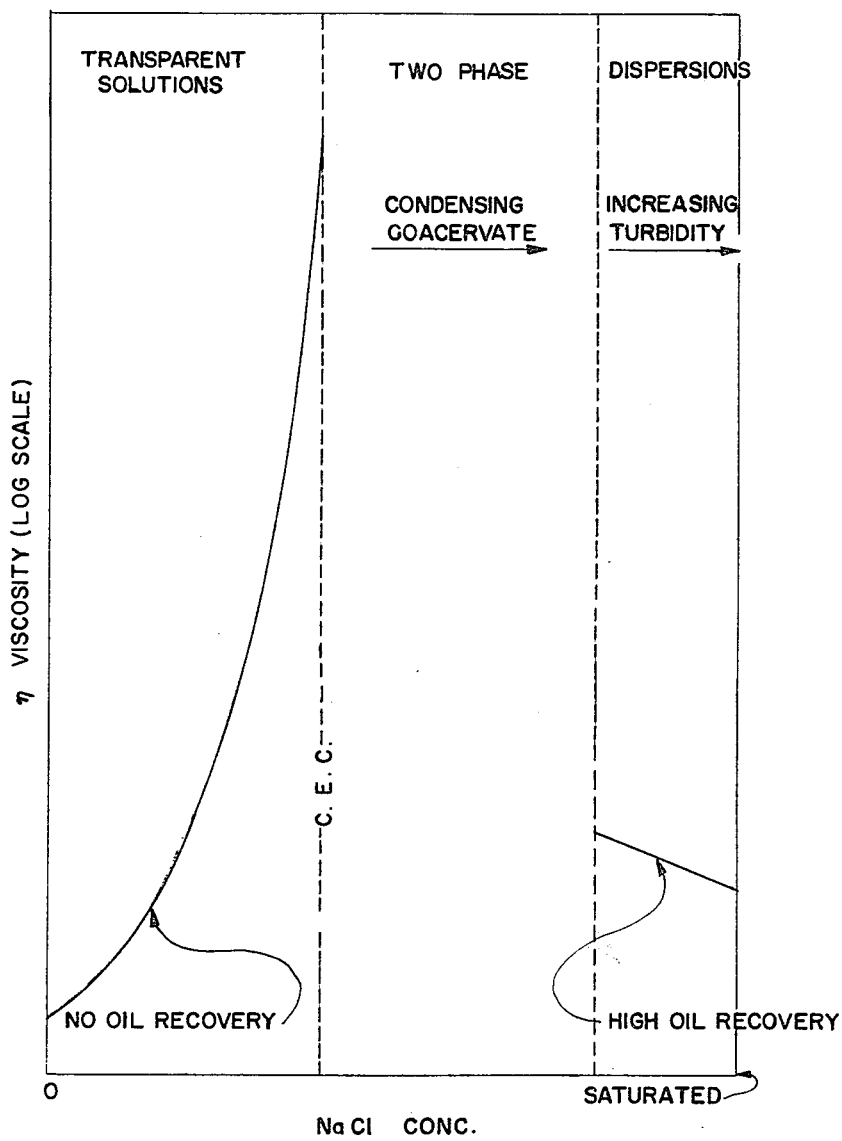

FIGURES 1A, 1B and 1C illustrate the effect of NaCl concentration on the recovery of petroleum from sand packs with sulfated alcohol (Neodol) ethoxylates; and FIGURE 2 shows the relationship between salt concentration, viscosity and oil recovery for typical sulfated ethoxylates.

The surfactants most useful are the sulfated polyoxylated alkanols having from 8 to 30 carbon atoms and their metal and non-metallic salts such as the alkali metal or ammonium or amine sulfated polyoxylated alkanols having preferably from 8 to 18 or 10 to 15 carbon atoms and can be prepared by sulfating oxyalkylated alkanols having from about 8 to about 30 carbon atoms and can be represented by the general Formula I

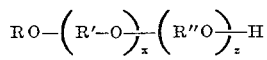

where R is an alkyl radical of 8 to 30 and preferably 8 to 18 carbon atoms, R' and R'' are dissimilar alkyl radicals from 1–6 carbon atoms and preferably are $C_2H_4$ and $C_3H_6$ radicals, respectively, $x$ and $z$ are positive integers of at least 1 and $y$ can be zero or a positive integer as $x$ or $z$. Preferred oxyalkylated alkanols can be represented by the general Formula II

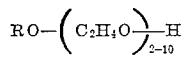

where R is an alkyl radical of 10–15 carbon atoms, the alcohol used in the ethoxylation being a mixture of alcohols of 10 to 15 carbon atoms. The ethoxylation of the alcohols can be accomplished by means well known in the art. The ethoxylation of primary alcohols to form products represented by Formulas I and II can be achieved using a strong base of Lewis acid catalysts such as NaOH, $BF_3$, or $SnCl_2$. Oxyalkylated primary alcohols represented by Formulas I and II can be prepared by the method described in U.S. Patents 3,036,130 or 3,101,574 or as described in copending patent application to Tsatsos et al., Ser. No. 661,546, filed Aug. 18, 1967.

The ethoxylated alcohols are available commercially from Shell Chemical Company under the trade name "Neodol" or from Conoco under the name "Alfol" and have properties as shown in Tables 1 and 1A.

Table 1

| | |
|---|---|
| Detergent alcohol carbon number range | $C_{12-13}$ |
| Melting range, ° C. | 11–15 |
| Color, APHA (Pt-Co) | 40 |
| Specific gravity, 50/25° C. | 0.963 |
| Flash point, Cleveland open cup, ° F. | 410 |
| Fire point, Cleveland open cup, ° F. | 445 |
| Cloud point, 1% solution, ° C. | 45 |
| Hydroxyl number, mg. KOH/gm. | 116 |
| Water (Karl Fischer), % w. | 0.3 |
| Acid value, eq./100 g. | <0.001 |
| Odor | Mild |

Other ethoxylated alcohols useful in aiding in oil recovery are shown in Table 1A and have the following properties where EO is —$CH_2CH_2O$— radical.

TABLE 1A

| Analyses | $C_{12}$–$C_{15}$ 3 EO | $C_{12}$–$C_{15}$ 7.5 EO | $C_{12}$–$C_{15}$ 9 EO |
|---|---|---|---|
| Ash, percent weight | 0.2 max. | 0.01 max. | 0.01 max. |
| Color, APHA | 100 max. | 75 max. | 75 max. |
| pH, 1% solution | 5.5–6.5 | Within 0.5 water used. | Within 0.5 water used. |
| Acid value, eq./100 g. | 0.004 max. | 0.0003 max. | 0.0003 max. |

Conoco "Alfol" alcohols such as "Alfonic" 1012-6 or 1218-6 have the structural formula:

$$CH_3—(CH_2)_x—CH_2—(OCH_2CH_2)_n—OH$$

where $x$ is 8–16 and $n=5.8$. Thus, "Alfonic" 1012-6 is a $C_{10-12}$ primary alcohol containing 6 ethylene oxide units.

The sulfation of the above polyethoxylated alkanols can be accomplished by reacting neat or in the presence of a solvent using as the sulfating agent any of the materials mentioned previously and preferably sulfur trioxide, chlorosulfonic acid or sulfuric acid. Thus, any of the ethoxylated alcohols shown in Table 1A can be sulfated by dissolving the alcohol in a solvent such as ethyl ether and adding dropwise chlorosulfonic acid keeping the temperature at 0–10° C. The HCl formed is removed by bubbling $N_2$ through the solution and the solution neutralized by adding gradually an aqueous methanol solution containing theoretical amounts of base. The solvent is then removed if desired. The sulfation can be also practiced without the use of a solvent.

EXAMPLE A $C_{12}$–$C_{15}$ (3 EO) alcohol as shown in Table 1A was placed in a reaction vessel and the temperature adjusted to 25° C. and 105% m. of chlorosulfonic acid was added dropwise over 15–30 minutes while maintaining the minimum temperature required to keep the reaction mixture fluid and generally this does not exceed 10° C. of the alcohol melting point. Nitrogen is passed throughout the reaction in order to remove HCl as it evolves. The reaction product is mixed with water and neutralized with a desired agent such as caustic or ammonium hydroxide.

The properties of ammonium and sodium salts of sulfated polyethoxylated primary alcohols are shown in Table 2.

TABLE 2.—AMMONIUM ALCOHOL/3 EO/SULFATES

| Analyses | $C_{12}$–$C_{15}$ 3 EOS | Alfol 1214 3 EOS | Coconut 3 EOS |
|---|---|---|---|
| Surfactant, eq./100 g | 0.122 | 0.115 | 0.106 |
| Surfactant, percent weight | 53.2 | 49.3 | 45.4 |
| Free alcohol, eq./100 g | 0.0006 | 0.0022 | 0.0011 |
| Free alcohol, percent weight | 0.26 | 0.44 | 0.22 |
| $H_2O$, percent weight | 45.4 | 49.6 | 50.9 |
| $(NH_4)_2SO_4$, percent weight | 1.1 | 0.66 | 0.71 |
| $NH_4Cl$, percent weight | 0.80 | 0.71 | 0.52 |
| Acidity, Ion-x, eq./100 g | 0.161 | 0.141 | 0.135 |
| Color (Klett 5% A.M.) | 14 | 13 | 30–40 (Joy=30) |
| Fe, p.p.m | 7.3 | 4.3 | 8 |
| .H, 1% solution | 6.0 | | |

Sulfates of ethoxylated primary alcohols are commercially available from Shell Chemical Company under the trade name Neodol 23–3A having the formula $C_{12-13}O(CH_2CH_2O)_3SO_3NH_4$ and Neodol 25–3S $$(C_{12-15}O(CH_2CH_2O)_3—SO_3Na)$$

which compounds have the following properties as shown in Table 3.

TABLE 3.—TYPICAL PHYSICAL AND CHEMICAL PROPERTIES OF NEODOL AND DERIVATIVES

| Analyses | Neodol Ethoxysulfates | |
|---|---|---|
| | 23–3A | 25–3S |
| Molecular weight | 423 | 441 |
| Active content, percent weight | 59 | 59 |
| EO content, percent weight | 31.2 | 29.8 |
| Melting range, ° C | | |
| Color, APHA | [1] 35 | [1] 35 |
| Specific gravity, 25/25° C | 1.01 | 1.02 |
| Ethanol, percent weight | 14 | 14 |
| UOM,[2] percent weight | 2.5 | 2.5 |
| Inorganic salt, percent weight | 1.0 | 1.0 |
| Odor | Mild | Mild |
| pH | 7.3 | 7.7 |

[1] Klett Color. [2] Unsulfated organic matter.

Other anionic sulfated ethoxylated alcohols are available from Union Carbide under the trade name Tergitol S having the formula

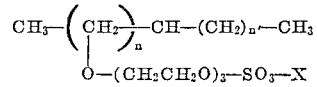

where X is $NH_4$ or Na and which have the properties shown in Table 4.

TABLE 4

| Property | Tergitol Anionic [1] | |
|---|---|---|
| | 15-S-3A [2] | 15-S-3S [3] |
| Alkyl carbon range | $C_{11}$-$C_{15}$ | $C_{11}$-$C_{15}$ |
| Average moles of ethylene oxide | 3 | 3 |
| Molecular weight | | |
| Active content, percent by wt | 435 | 440 |
| Color platinum-cobalt | [4] 60 | [4] 60 |
| Odor | Mild and Characteristic | |
| Cloud Point, 1.0% aqueous solution, °F | | |
| Pour point, °F | −33 | −49 |
| pH, 1.0% aqueous solution at 77°F | [5] 6.5-7.5 | [5] 8.0-10.0 |
| Solubility in water at 77°F | Soluble | Soluble |
| Apparent specific gravity at 25/25°C | 1.039 | 1.057 |
| Pounds per gallon at 68°F | 8.65 | 8.80 |
| Viscosity, cks.: | | |
| At 68°F | 43 | 49 |
| At 104°F | 22 | 23 |
| At 212°F | | |
| HLB Number | | |
| Flash point, °F., Cleveland Open Cup (ASTM Method D 92) | 195 | [6] 172 |

[1] Composition: ethoxysulfate.
[2] Cation: ammonium.
[3] Cation: sodium.
[4] 10 percent solution in water; Klett-Summerson units.
[5] Determined on a 2% aqueous solution.
[6] Determined by ASTM Method D 1310 using Tag open cup.

In general the surfactants used in the present invention may include fatty acids, alkylated polyoxylated phenols, polypropylene glycolethylene oxide condensates and their thio and amino derivatives. Thus, ethoxylated materials such as polyoxylated alkyl phenols available under the trade name of Triton X-100 or polyethoxylated amines or polyethoxylated fatty acids and their derivatives available under the trade name of Ethomeens, Ethomids and Ethofats from Armour Chemical Company can be sulfated by suitable means using chloro sulfonic acid or other sulfating acids to form the desired end product.

The electrolytic material used in high concentrations of at least 1 mole and preferably higher can be a halide such as sodium chloride, bromide, iodide and mixtures thereof of which preferred is NaCl, a sulfate, such as sodium sulfate, a borate such as sodium tetraborate, a phosphate, a silicate or the like where the cations are alkali metal ions, alkaline earth metal ions or substantially any cation that produces a water-soluble salt.

DESCRIPTION OF THE PREFERRED EMBODIMENT

To illustrate the synergistic effect of the additive mixture of the present invention in recovering oil from 3d sand packs containing approximately 25% Pv residual oil, packs were treated with aqueous solutions containing 5% by weight sulfated ethoxylated (3 EO) primary alcohol having from 12 to 15 carbon atoms, aqueous solutions containing 5% by weight sulfated ethoxylated (4 EO) primary alcohol and such solutions to which were added, respectively, 1.0, 1.5 and 5 M of NaCl. Oil recovery results for each of these systems are shown in FIGURE 1 (A and B) and it can be seen that, for systems containing 0, 1.0 and 1.5 M NaCl, oil recovery was ineffective, whereas, for systems containing 4 and 5 M NaCl, excellent oil recovery was obtained.

FIGURE 1(C) shows the results of a similar oil recovery test using a sulfated ethoxylated secondary alcohol in a Berea sandstone core having a permeability of 400 millidarcies.

Table 5 shows the effect of NaCl concentration upon viscosity of the polyoxylated sulfate investigated. It is to be noted that for solutions containing 5% surfactant the viscosity exhibits a maximum value at a salt concentration of about 1.5 M for a 3 EO sulfate, which indicates that the improved recoveries shown in FIGURE 1 are not simply the result of an increased viscosity. It should also be noted that for surfactant concentrations as low as 0.1 it is favorable to incorporate the electrolyte in concentrations exceeding those that form two-phase coacervate systems.

TABLE 5.—THE EFFECT OF NaCl CONCENTRATION ON THE VISCOSITY OF PRIMARY ALCOHOL (EO) SULFATE
[Brookfield 6 r.p.m.]

| Compound | Conc. SA, percent | Conc. NaCl (M) [1] | Viscosity (cp.) | Spindle No. |
|---|---|---|---|---|
| Na salt of sulfated primary aliphatic $C_{12-15}$ alcohol (3 EO) | 5.0 | 0 | 2.0 | [2] U.L. |
| | | 1.0 | 68 | U.L. |
| | | 1.5 | 3,860 | 2 |
| | | 2.0 | 3,450 | 2 |
| | | 2.5 | 2 phase | |
| | | 3.0 | 2 phase | |
| Do | 3.0 | 0 | 1.6 | U.L. |
| | | 1.0 | 8.2 | U.L. |
| | | 1.5 | 610 | 2 |
| | | 2.0 | 1,710 | 2 |
| | | 2.5 | 2 phase | |
| | | 3.0 | 2 phase | |
| Do | 1.0 | 0 | 1.4 | U.L. |
| | | 1.0 | 1.9 | U.L. |
| | | 1.5 | 10.0 | U.L. |
| | | 2.0 | 167 | No. 1 |
| | | 2.5 | 2 phase | |
| | | 3.0 | 2 phase | |
| Do | 0.5 | 0 | 1.2 | U.L. |
| | | 1.0 | 1.7 | U.L. |
| | | 1.5 | 3.0 | U.L. |
| | | 2.0 | 18.2 | U.L. |
| | | 2.5 | 2 phase | U.L. |
| | | 3.0 | 2 phase | U.L. |
| Do | 0.1 | 0 | 1.3 | U.L. |
| | | 1.0 | 1.5 | U.L. |
| | | 1.5 | 1.6 | U.L. |
| | | 2.0 | 1.8 | U.L. |
| | | 2.5 | 2 phase | |
| | | 3.0 | 2 phase | U.L. |

[1] The salt concentrations shown are based upon calculated quantities of NaCl introduced into the surfactant solutions. The true concentration of dissolved NaCl is lower than that shown because its solubility decreases as anionic surfactant concentration increases. In several systems undissolved NaCl is present. Analysis has not yet been performed.
[2] Ultra low adapter.

The relationship between salt concentration, viscosity and oil recovery for typical sulfated ethoxylates is shown schematically in FIGURE 2. It will be noted that there occurs a pronounced increase in viscosity with increasing inorganic electrolyte concentration. The solutions are optically transparent. At a critical electrolyte concentration (S.E.C.) a two-phase coacervate system forms. This coacervate becomes increasingly condensed as sodium chloride concentration increases. With a further rise in salt concentration the condensed coacervate becomes dispersed, forming lower viscosity suspensions which exhibit increasing turbidity with increasing salt concentration. For NaCl concentrations below the C.E.C. the solutions are ineffective for oil recovery even at relatively very high viscosity. Oil recovery activity is exhibited only by the turbid (high salt) systems.

It has been found that the salt concentration for maximum viscosity in the viscosity vs. salt concentration relationship varies with EO content of the ethoxylated sulfate product; it increases with increasing EO content. As EO content varies between 1 and 5, the NaCl concentration for maximum viscosity may vary between 0.5 and 5.0 moles at a given temperature. The addition of electrolyte in excess of that necessary to produce the maximum viscosity results in some non-obvious effects which form the basis for this patent application.

The interfacial tension against petroleum of the active system (right hand portion of FIGURE 2) is extremely low ($10^{-4}$ dynes/cm.). This is out of the range of interfacial tension reduction experienced by the addition of builders, e.g. Na sulfate, phosphate, etc. under normal conditions (i.e., in respect to conventional surfactant systems).

Earth formations conditioned by injection thereof of aqueous solutions containing the additive mixture of this invention produce more oil more efficiently when such treated formations are subsequently or concurrently subjected to a drive fluid to recover oil. The drive fluids can contain the additive mixture of this invention, thickeners, viscosity increasers, pushers and the like, e.g., polyacrylamides and derivatives, polyalkylene oxide polymers, polyvinyl-alcohol sulfate and the like some of which are described in U.S. Patents 3,341,319; 3,332,904; 3,254,719; 3,367,418; 3,368,620 and 3,370,649. The thickeners can be introduced ahead of, in solution with, or behind the additive mixture of this invention.

It is understood that various changes in the details described to explain the invention can be made by persons skilled in the art within the scope of the invention as expressed in the appended claims.

I claim as my invention:

1. An improved method for recovering oil from an oil-bearing formation by means of a drive fluid, the improvement comprising injecting into said formation a slug of an aqueous solution containing a synergistic mixture of a water-soluble sulfated polyoxylated organic surfactant and a soluble inorganic electrolyte in a concentration exceeding the critical concentration for forming a two-phase coacervate system by an amount sufficient to convert the two-phase system to a turbid dispersion.

2. The method of claim 1 wherein the drive fluid is water, the aqueous solution is water and the additives are at least one sulfated polyethoxylated alcohol surfactant containing from 3 to 5 ethylene oxide groups and a soluble inorganic electrolyte present in a concentration of from about 4 to 5 molar capable of forming a homogeneous dispersed system at a salt concentration greater than that required to form a two-phase system.

3. The method of claim 2 wherein the water phase of the slug solution is selected from the group consisting of oil field produced water, source water, fresh water and sea water.

4. The method of claim 2 wherein the waterflood contains an electrolyte.

5. The method of claim 1 wherein the surfactant is sulfated polyethoxylated primary aliphatic alcohol of 12 to 15 carbon atoms and the electrolyte is NaCl present in a concentration of at least 2 M exceeding the critical concentration for forming a two-phase coacervate system by an amount sufficient to convert the two-phase system to a turbid dispersion.

6. The method of claim 1 wherein the surfactant is sulfated polyethoxylated secondary aliphatic alcohol of 12 to 15 carbon atoms and the electrolyte is NaCl present in a concentration of at least 2 M exceeding the critical concentration for forming a two-phase coacervate system by an amount sufficient to convert the two-phase system to a turbid dispersion.

References Cited

UNITED STATES PATENTS

| | | | |
|---|---|---|---|
| 2,827,964 | 3/1958 | Sandiford et al. | 166—274 |
| 3,318,379 | 5/1967 | Bond et al. | 166—273 |
| 3,326,287 | 6/1967 | Corrin | 166—273 |
| 3,330,344 | 7/1967 | Reisberg | 166—274 |
| 3,333,634 | 8/1967 | Townsend et al. | 166—274 X |
| 3,347,789 | 10/1967 | Dickson et al. | 166—280 |
| 3,373,107 | 3/1968 | Rice et al. | 166—275 |
| 3,373,809 | 3/1968 | Cooke | 166—274 X |

STEPHEN J. NOVOSAD, Primary Examiner

U.S. Cl. X.R.

166—275